United States Patent
Kipnis et al.

(10) Patent No.: US 8,799,405 B2
(45) Date of Patent: Aug. 5, 2014

(54) SYSTEM AND METHOD FOR EFFICIENTLY STREAMING DIGITAL VIDEO

(75) Inventors: Sergey Kipnis, Pleinfeld (DE); Mariusz Legowski, Gdansk (PL); Hubert Gburzynski, Krakow (PL); William Platt, Pleasanton, CA (US); Krzysztof Weiss, Bialystok (PL)

(73) Assignee: nComputing, Inc., Santa Clara, CA (US)

( * ) Notice: Subject to any disclaimer, the term of this patent is extended or adjusted under 35 U.S.C. 154(b) by 325 days.

(21) Appl. No.: 13/196,143

(22) Filed: Aug. 2, 2011

(65) Prior Publication Data
US 2012/0143983 A1  Jun. 7, 2012

Related U.S. Application Data
(60) Provisional application No. 61/369,879, filed on Aug. 2, 2010.

(51) Int. Cl.
*G06F 15/16* (2006.01)
*G06F 3/14* (2006.01)

(52) U.S. Cl.
CPC ........... *G06F 3/14* (2013.01); *G09G 2350/00* (2013.01); *G09G 2370/022* (2013.01); *G06F 3/1454* (2013.01)
USPC ........... 709/217; 709/218; 709/231; 709/236; 370/477; 375/240

(58) Field of Classification Search
USPC ............ 709/217, 231–236; 370/477; 375/240
See application file for complete search history.

(56) References Cited

U.S. PATENT DOCUMENTS

| | | | |
|---|---|---|---|
| 6,278,645 B1 | 8/2001 | Buckelew et al. | |
| 6,496,873 B1 * | 12/2002 | Brunet et al. | 719/321 |
| 7,143,432 B1 * | 11/2006 | Brooks et al. | 725/105 |
| 7,339,993 B1 * | 3/2008 | Brooks et al. | 375/240.26 |
| 7,359,438 B2 * | 4/2008 | Beyette et al. | 375/240.01 |
| 7,500,011 B2 * | 3/2009 | Glaser et al. | 709/236 |
| 7,725,593 B2 * | 5/2010 | Visharam et al. | 709/231 |
| 8,233,527 B2 * | 7/2012 | Schmit et al. | 375/240 |

(Continued)

FOREIGN PATENT DOCUMENTS

| | | |
|---|---|---|
| TW | 201212632 A | 3/2012 |
| WO | WO-2012018786 A1 | 2/2012 |

OTHER PUBLICATIONS

"International Application Serial No. PCT/US2011/046227, International Preliminary Report on Patentability mailed Feb. 14, 2013", 5 pgs.

(Continued)

*Primary Examiner* — Wing F Chan
*Assistant Examiner* — Razu Miah
(74) *Attorney, Agent, or Firm* — Schwegman, Lundberg & Woessner, P.A.

(57) ABSTRACT

In a system and method for streaming video information, a video device driver is configured to analyze video frames stored in a frame buffer to identify a video stream. Video frames identified as containing a video stream are excluded from rendering. An encoding format-independent media transport is configured to encode a copy of a video frame containing the video stream according to an encoding format supported by a client device requesting the video stream. The media transport further is configured to transmit the encoded video frame copy to the client device.

19 Claims, 7 Drawing Sheets

(56) References Cited

U.S. PATENT DOCUMENTS

| | | | |
|---|---|---|---|
| 8,606,949 B2* | 12/2013 | Wogsberg et al. | 709/231 |
| 2003/0206558 A1* | 11/2003 | Parkkinen et al. | 370/477 |
| 2004/0151200 A1* | 8/2004 | Robertson | 370/449 |
| 2004/0228365 A1* | 11/2004 | Kobayashi | 370/477 |
| 2005/0010960 A1* | 1/2005 | Kitazawa et al. | 725/117 |
| 2006/0050785 A1* | 3/2006 | Watanabe et al. | 375/240.03 |
| 2006/0282855 A1 | 12/2006 | Margulis | |
| 2007/0153713 A1* | 7/2007 | Anttila | 370/270 |
| 2007/0186002 A1* | 8/2007 | Campbell et al. | 709/231 |
| 2007/0201562 A1* | 8/2007 | Ganesh et al. | 375/240.26 |
| 2009/0006643 A1* | 1/2009 | Lee | 709/231 |
| 2009/0046152 A1* | 2/2009 | Aman | 348/157 |
| 2009/0303156 A1* | 12/2009 | Ghosh et al. | 345/1.2 |
| 2010/0146139 A1* | 6/2010 | Brockmann | 709/231 |
| 2013/0223539 A1* | 8/2013 | Lee et al. | 375/240.25 |

OTHER PUBLICATIONS

"International Application Serial No. PCT/US2011/046227, Search Report mailed Dec. 19, 2011", 2 pgs.

"International Application Serial No. PCT/US2011/046227, Written Opinion mailed Dec. 19, 2011", 4 pgs.

* cited by examiner

SYSTEM AND METHOD FOR EFFICIENTLY STREAMING DIGITAL VIDEO

CROSS-REFERENCE TO RELATED APPLICATIONS

This application claims priority under 35 U.S.C. §119 to U.S. Provisional Patent Application Ser. No. 61/369,879, filed Aug. 2, 2010, and entitled "SYSTEM AND METHOD FOR EFFICIENTLY STREAMING DIGITAL VIDEO"), which application is incorporated herein by reference in its entirety.

TECHNICAL FIELD

The present invention relates to the field of video processing. In particular, but not by way of limitation, the present invention discloses techniques for efficiently streaming digital video.

BACKGROUND

Computer systems are tasked with delivering ever increasing amounts of video and other media over the Internet and other networks. This increase stems in part from the emergence and acceptance of online websites that stream video and other media to users. However, transmitting video and media data over a network can consume large amounts of network bandwidth and adversely affect network performance. With the popularity of streaming video and media, it has become difficult to efficiently stream video and media data without requiring a very high-bandwidth communication channel.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings of the present disclosure can be used in other environments wherein digital video information is processed or streamed. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

Computer Systems

Figure 1:
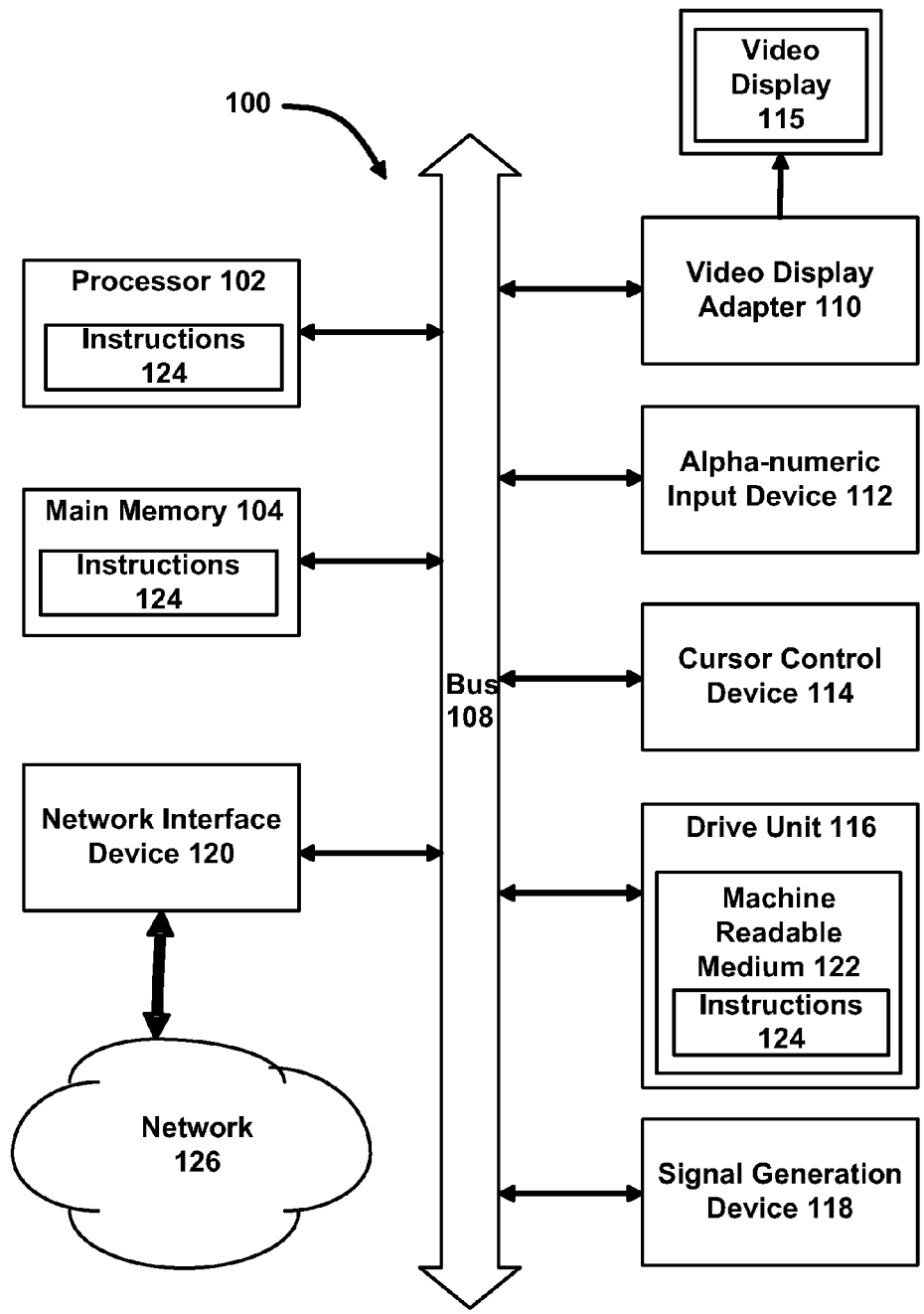
FIG. 1 illustrates a diagrammatic representation of machine in the example form of a computer system within which a set of instructions, for causing the machine to perform any one or more of the methodologies discussed herein, may be executed.

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), and a main memory 104 that communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as "software") embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known Transmission Control Protocol and Internet Protocol (TCP/IP), Internet Protocol Suite, or File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

The Resurgence of Terminal Systems

Before the advent of the inexpensive personal computer, the computing industry largely used mainframe or mini-computers that were coupled to many "dumb" terminals. Such terminals are referred to as 'dumb' terminals since the computing ability resided within the mainframe or mini-computer and the terminal merely displayed an output and accepted alpha-numeric input. No user application programs executed on a processor within the terminal system. Computer operators shared the mainframe computer with multiple individual users that each used terminals coupled to the mainframe computer. These terminal systems generally had very limited graphic capabilities and were mostly visualizing only alpha-numeric characters on the display screen of the terminal.

With the introduction of the modern personal computer system, the use of dumb terminals and mainframe computer became much less popular since personal computer systems provided a much more cost effective solution. If the services of a dumb terminal were required to interface with a legacy terminal based computer system, a personal computer could easily execute a terminal emulation application that would allow the personal computer system to emulate the operations of a dumb terminal at a cost very similar to the cost of a dedicated dumb terminal.

During the personal computer revolution, personal computers introduced high resolution graphics to personal computer users. Such high-resolution graphics allowed for much more intuitive computer user interfaces than the traditional text-only display. For example, all modern personal computer operating systems provide user interfaces that use multiple different windows, icons, and pull-down menus that are implemented in high resolution graphics. Furthermore, high-resolution graphics allowed for applications that used photos, videos, and graphical images.

In recent years, a new generation of terminal systems have been introduced into the computer market as people have rediscovered some of the advantages of a terminal based computer systems. For example, computer terminals allow for greater security and reduced maintenance costs since users of computer terminal systems cannot easily introduce computer viruses by downloading or installing new software. Only the main computer server system needs to be closely monitored in terminal-based computer systems. This new generation of computer terminal systems includes high-resolution graphics capabilities, audio output, and cursor control system (mouse, trackpad, trackball, etc.) input that personal computer users have become accustomed to. Thus, modern terminal systems are capable of providing the same features that personal computer system users have come to expect.

Modern terminal-based computer systems allow multiple users at individual high-resolution terminal systems to share a single personal computer system and all of the application software installed on that single personal computer system. In this manner, a modern high-resolution terminal system is capable of delivering nearly the full functionality of a personal computer system to each terminal system user without the cost and the maintenance requirements of an individual personal computer system for each user.

A category of these modern terminal systems is called "thin client" systems since the terminal systems are designed to be very simple and limited (thus "thin") and depend upon server system for application processing activities (thus it is a "client" of that server system). The thin-client terminal system thus mainly focuses only on conveying input from the user to the centralized server system and displaying output from the centralized server system to the terminal user. Note that although the techniques set forth this document will be disclosed with reference to thin-client terminal systems, the techniques described herein are applicable in other fields that stream or process digital video. For example, any system that needs to efficiently stream digital video information may use the teachings disclosed in this document.

Figure 2A:
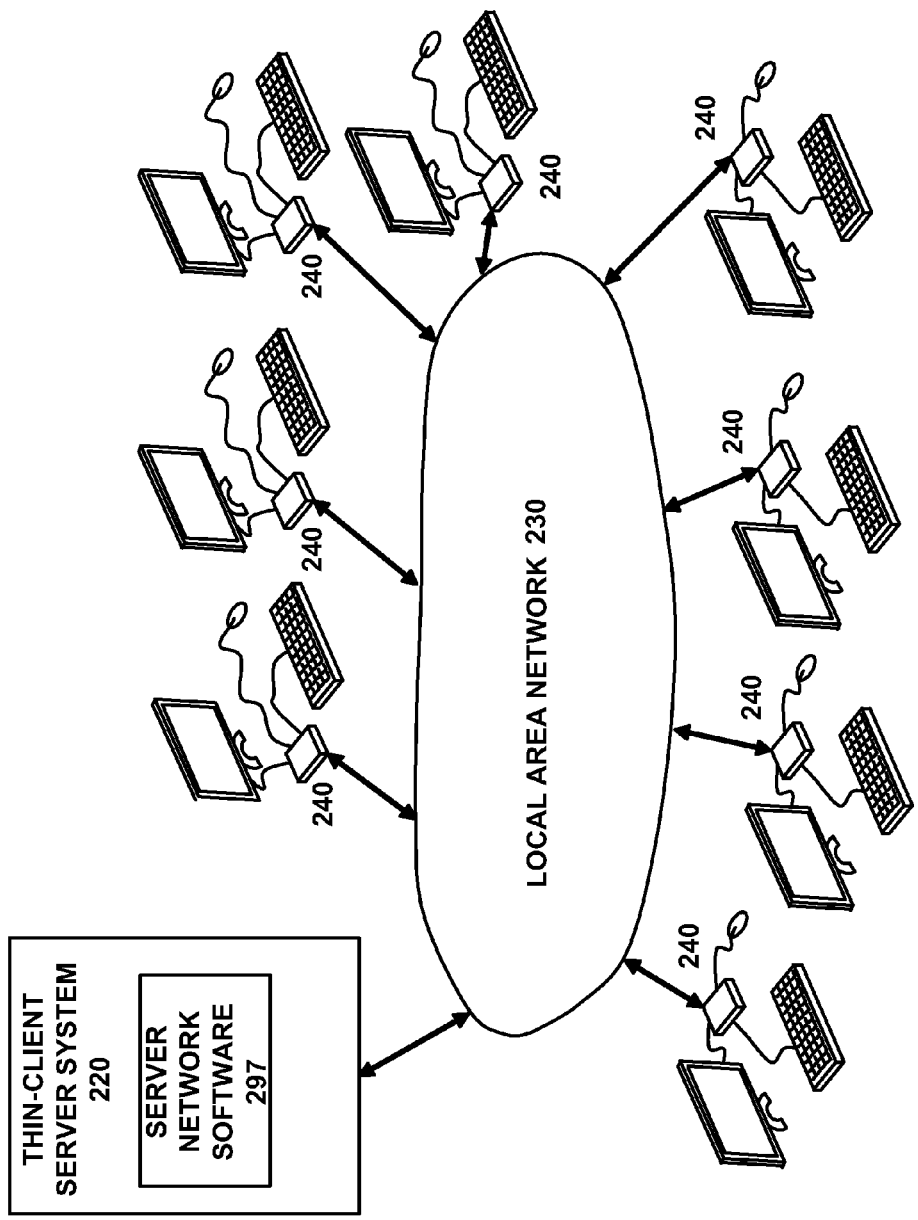
FIG. 2A illustrates a high-level block diagram of an example single thin-client server computer system supporting multiple individual thin-client terminal systems using a local area network.

FIG. 2A illustrates a conceptual diagram of a thin-client environment. Referring to FIG. 2A, a single thin-client server computer system 220 provides computer processing resources to many thin-client terminal systems 240. In the embodiment of FIG. 2A, each of the individual thin-client terminal systems 240 is coupled to the thin-client server computer system 220 using local area network 230 as a bi-directional communication channel. The individual thin-client terminal systems 240 transmit user input (such as key strokes and mouse movements) across the local area network 230 to the thin-client server computer system 220 and the thin-client server computer system 220 transmits output information (such as video and audio) across the local area network 230 to the individual thin-client terminal systems 240.

Figure 2B:
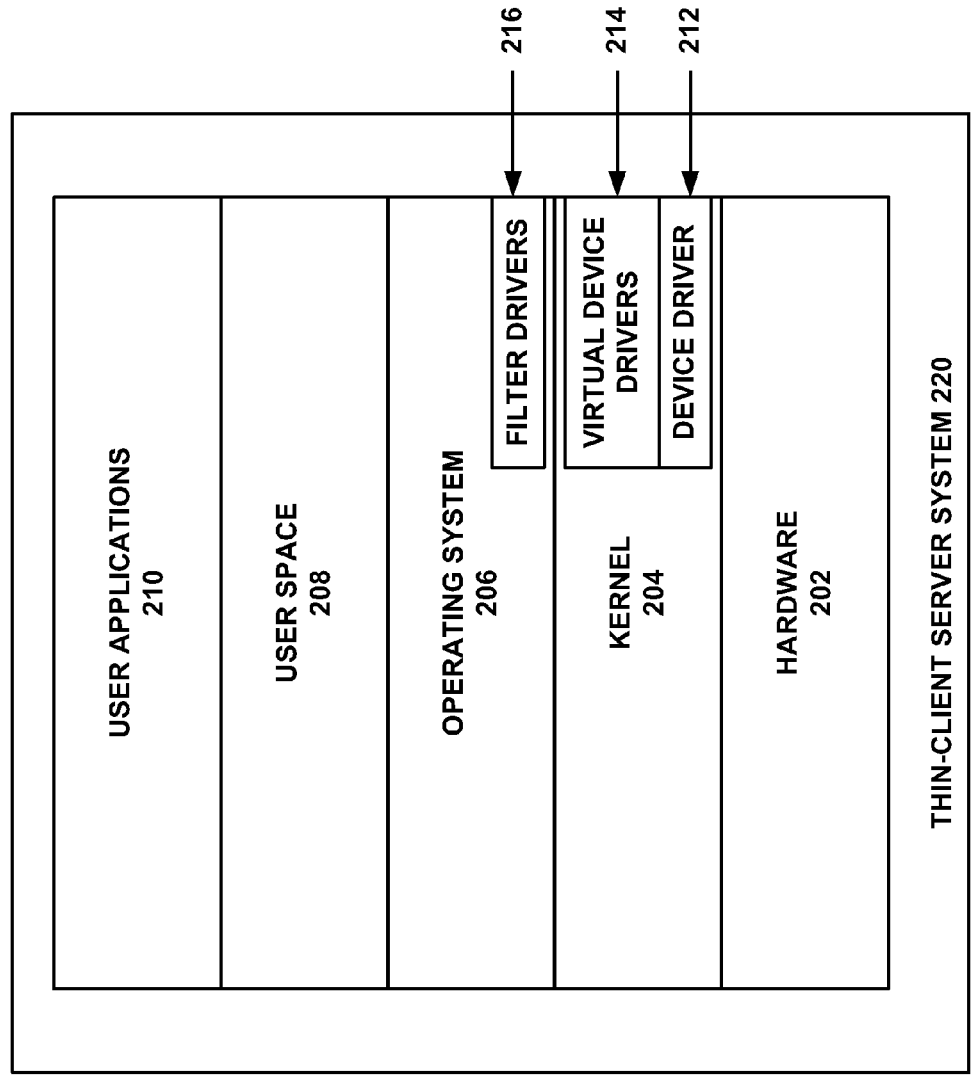
FIG. 2B illustrates a hierarchical diagram of one embodiment of a thin-client server computer system as depicted as a series of abstraction layers.

FIG. 2B illustrates a hierarchical diagram of one embodiment of a thin-client server computer system 220 as depicted as a series of abstraction layers. Although not shown, the thin-client server computer system 220 is connected to one (of possibly many) thin-client terminal system 240 via a network. When viewed as a series of abstraction layers, the thin-client server computer system 220 includes a hardware layer 202, a kernel layer 204 residing above and interfacing with the hardware layer 202, an operating system layer 206, a user space layer 208 residing above the operating system layer 206, and an application layer 210 residing above the user space layer 208. Although shown separately, the kernel 204 may be a core component of the operating system layer 206.

The operating system 206 may be viewed as a set of software programs that facilitate the interfacing between applications 210 and the underlying hardware 202 of the thin-client server system 220. The kernel 204 is generally considered the central or core component of the operating system 206. The kernel's 204 primary purposes are to manage the thin-client server system's 220 resources and to allow other programs to run and use these resources. Several of the kernel's 204 tasks may include process management, memory management, and device management. Process management may include the kernel 204 defining a portion of memory that each application is allowed to access in order to execute the application. Memory management may include the kernel 204 regulating access to memory and establishing areas of memory to be used by executing processes. Device management may include the kernel 204 controlling access to devices connected to the computer, such as peripherals, through the use of device drivers. Executing processes corresponding to applications interface with the kernel 204 through system calls, in which the processes attempt to use the functionality and services offered by the kernel.

One functionality commonly supported by the operating system 206 is the processing and rendering of multimedia (e.g., video). The operating system 206 facilitates interfacing between an application and a video device driver 212 stored in memory to render and/or process video data. For a remote desktop environment, a virtual device driver may emulate the graphics device driver, such that a client system (not shown) operates under the illusion of accessing the actual graphics device driver to render video data.

A non-limiting illustration of the video rendering and processing capabilities of an operating system is shown by the Microsoft Windows® operating systems. The Microsoft Windows® operating systems provide a collection of application programming interfaces (API) for handling multimedia tasks. These APIs are commonly known as Microsoft DirectX®. Included in DirectX® is a media subsystem component called DirectShow®, which handles multimedia playback and streaming media. DirectShow® operates by dividing a multimedia task into a sequence of processing steps, known as filter drivers 216. Each filter driver 216 has input and/or output pins that may be used to connect the filter driver 216 to other filter drivers 216. To process video playback or video streaming, a filter graph is built by creating instances of required filter drivers and then connecting the filter drivers together. A sample filter graph for video playback may implement one or more functions such as file parsing, video and audio demultiplexing, video decoding, and video rendering. At its most basic level, DirectShow® operates to read video data from a file and render the data as a video frame to be placed in a frame buffer, which is a memory buffer capable of storing a complete frame of data. DirectShow® further supports a limited number of filter drivers for decoding certain media file formats. The result of executing a DirectShow® filter graph for video playback or streaming may be a series of decoded video frames. A disadvantage of relying on DirectShow® for video playback is that only a small percentage of videos commonly streamed over networks are capable of being processed using DirectShow®. For example, videos conforming to different multimedia frameworks, such as Apple's QuickTime®, Adobe's Flash®, and RealNetworks's RealVideo®, may be incapable of being streamed by DirectShow®.

Although the video rendering and processing capabilities of an operating system are described above with reference to the Microsoft Windows® operating systems, the embodiments of the present application may equally address the limitations of APIs of other operating systems, such as the Linux® operating system, that handle multimedia tasks. For example, the embodiments of the present application may address the limitations of the X Window system, including X11, supported by the Linux® operating system, including X11. In another example, the embodiments of the present application may address the limitations of the X video extension (XV) X server API supported by various servers. Like the Microsoft Windows® operating systems described above, the Linux® operating system and servers supporting the XV API also may use a filter graph of connected filter drivers to handle multimedia tasks, and consequently, also may suffer from the same limitations and disadvantages mentioned above with respect to the Windows® operating system. Moreover, the filter graph and filter driver technique for handling multimedia tasks has serious limitations for proprietary and/or high performance computing products.

Figure 3:
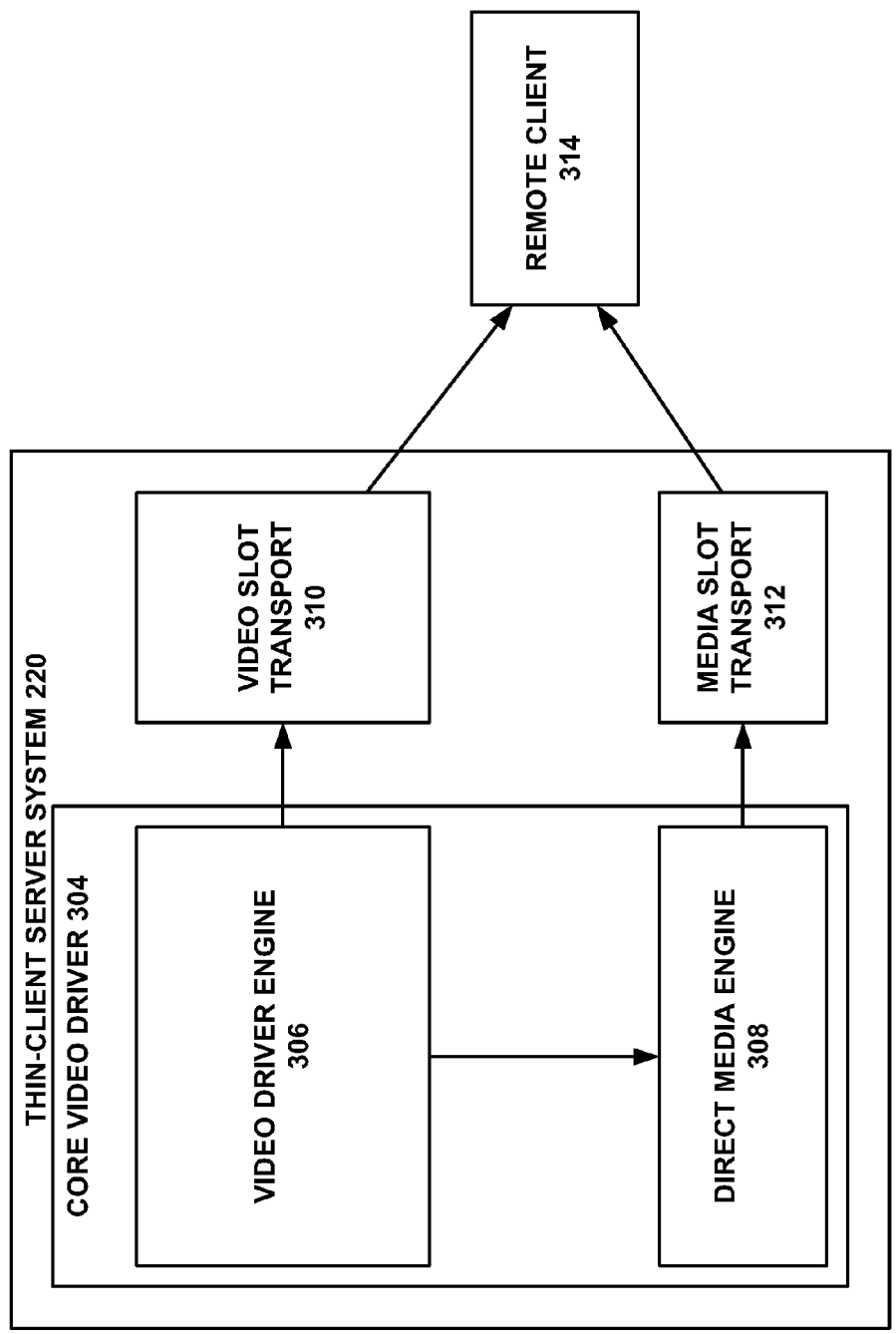
FIG. 3 illustrates a block diagram of an example video device driver configured to stream video information.

Referring to FIG. 3, the thin-client server system 220 may implement an alternative path for streaming video to a thin-client terminal system 314. In the operating system of the thin-client server system 220, virtualized device drivers may be created to handle different input and output tasks for the terminal system. One virtual device driver used to implement the alternative path may be a virtual video device driver, such as core video driver 304, that controls video input and output. In some embodiments, the video device driver may be a physical video device driver.

The virtual video device driver may reside next to the video device driver on the same level in the kernel. The virtual or physical video device driver may include a video driver engine 306 and a Direct Media engine 308. The video driver engine 306 may process graphics updates and pass the graphics updates to a video slot transport channel 310 for transmission to a remote client 314. The graphics updates may include bit-mapped graphics to be displayed on a display device of the remote client 314. The Direct Media engine 308 may handle streaming video incapable of being processed by DirectShow® and may send streaming video through the media slot transport channel 312. Video slot transport channel 310 and media slot transport channel 312 may be encoding format-independent data transport multiplex channels capable of sending multiple types of encoded video frames to the remote client. In some embodiments, the video slot transport channel 310 is a channel dedicated to desktop representation data, such as graphics updates. In some embodiments, the media slot transport channel 312 is a channel dedicated to streaming video or movie-related desktop or window data. For example, the media slot transport channel 312 may send DirectShow® video, video encoded in the YUV color space (e.g., full screen video), and encoded video frames, such as JPEG-encoded video frames, while the video slot transport channel 310 may transmit RGB data corresponding to screen updates.

To maximize efficiency, the core video driver 304 may leverage the existing video rendering system provided by the operating system. In other words, in some embodiments, no rendering system is added to the thin-client server system 220 beyond that which is provided by the operating system. Additionally, in some embodiments, no special software or codecs are required. Instead, the core video driver 304 takes advantage of the video rendering functionality of the operating system and the decoding capabilities of the remote client 314 to handle streaming media.

For example, in some embodiments involving the Windows® operating systems, to handle video or graphics updates, a Windows video driver may access an object or data structure called SURFOBJ to obtain information about a bitmap or device surface. In some embodiments, the Windows video driver specifically accesses an iUniq parameter of the SURFOBJ data structure to determine whether a region of the bitmap or device surface being updated is a video or scroll area. The iUniq parameter may specify the current state of a specified surface. Every time the surface changes, the value of the iUniq parameter is incremented. If the region being updated is a scroll area, the SURFOBJ iUniq parameter may change quickly in time.

In some embodiments, the virtual or physical video device driver may check well-known applications to determine if they are the sources of video frames and filter frames. In some embodiments, the virtual or physical video device driver may determine if an application is the source of video frames and filter frames based on the name of the application. Based on the application name, the virtual or physical video device driver may determine the video and graphics capabilities of the application. For example, the virtual or physical video device driver may know that Explorer.exe is the executable file for the Windows Explorer file management system and that Explorer.exe never streams video content. In another example, the virtual or physical video device driver may know that Cmd.exe, the Microsoft command line interpreter, never streams video content. In another example, the virtual or physical video device driver may know that Vlc.exe, the executable file for the VLC media player, never scrolls. A listing of such applications may be defined by the user and/or the virtual or physical display driver provider.

The Direct Media engine 308 processes streaming video by monitoring the frame buffer containing video frames of data. If the data in the frame buffer appears to be moving video, the core video driver 304 makes a copy of the frame buffer and sends the copy to the Direct Media engine 308. Determination of moving video may entail determining if a particular region of a screen is updated quickly and regularly. In one example embodiment, quick updates of a screen region may comprise updates of more than 12 times a second. In one example embodiment, regular updating of a particular region of a screen may comprise examining the region of the screen to determine if frame buffer updates are occurring for at least half a second or longer. A delay may be implemented when monitoring the frame buffer for moving video to compensate for false stream determination issues. In certain circumstances, the Direct Media engine 308 may falsely determine that motion in a video frame indicates a moving video. The culprit for the false determination may be fast scrolling of an application window such that the scrolling mimics a video. To compensate for fast scrolling, if the application has a scroll bar, a delay may be implemented to allow the Direct Media engine 308 to determine whether motion in the video frame is the result of scrolling or the result of an actual video stream.

Referring back to the operation of the core video driver 304, in an example embodiment, a purpose in copying the contents of the frame buffer is to ensure that the size of the video frames operated on by the Direct Media engine 308 matches the size of the frame buffer. In this respect, the need for additional post-processing (e.g., re-sizing, cropping, moving) of video frames subsequent to processing by the Direct Media engine 308 is obviated because the video frames output by the Direct Media engine 308 will match the size of the video frames stored in the frame buffer.

The Direct Media engine 308 receives the video frame copied from the frame buffer and encodes the frame according to a format supported by a decoder in the remote client. In one example embodiment, the Direct Media engine 308 may encode video frames in a JPEG encoding format. The resulting JPEG-encoded video frame may be placed in the video stream to be transmitted to the client via the media slot transport channel 312. Thus, the Direct Media engine 308 may output a series of encoded video frames for streaming to the remote client. In the example where a JPEG encoder is used to encode video frames, the resulting output from the Direct Media engine 308 may be a stream of simple JPEG images. The JPEG images are sent via the media slot transport channel to the remote client.

The Direct Media engine 308 further is configured to transmit a signalling frame among the set of encoded video frames sent to the remote client. The signalling frame may be a frame of a certain hue or color, such as a blue block frame. The signalling frame may trigger certain unique properties or actions in the client device. For example, the signalling frame may notify the remote client 314 to use its own scaler on the encoded video frames. The remote client 314 may receive a compressed frame, such as a JPEG image, and may use its scaler to increase the size of the received frame. One possible application is the use of the signalling frame and the scaler to display full screen video. Because of bandwidth consumption issues, it may be undesirable to transmit full screen video from the server system 220 to the remote client 314. As a result, full screen video frames may be compressed and sent to the remote client 314 along with a signalling frame that notifies the remote client 314 to use its scaler to increase the size of the received frames to occupy the full display screen.

In an example embodiment, a part of the goal to enhance, ideally maximize, efficiency in processing streaming video results in the Direct Media engine 308 not operating on every video frame. For example, streaming video capable of being processed by the existing rendering system provided by the operating system may be transmitted to the client without being routed through the Direct Media engine 308. In the case of a Microsoft Windows® operating system, if the streaming video can be processed by the DirectShow® media subsystem, the Direct Media engine 308 is not invoked. Rather, the video stream is sent over the media slot transport channel 312 to the remote client directly. Further, full screen video, as indicated by the presence of a stretchblt function call, may be handled separately from the Direct Media engine 308. In particular, full screen video may be processed by encoding the video in a special full screen mode in the YUV color space. Further, if the region of the video frame containing moving video is smaller than a predetermined size, encoding of the video frame may be skipped, and the video frame may be transmitted to the remote client directly. The rationale for bypassing encoding of such a video frame is that a video frame containing a small region of moving video does not occupy too much bandwidth on the network and does not require excessive decoding or processing on the client side. In one example embodiment, the minimum size of moving video in a video frame that warrants processing by the Direct Media engine 308 is 320 pixels by 240 pixels. The minimum size of moving video is irrespective of the resolution of the display device that displays the video.

Thus, in an example embodiment, the Direct Media engine 308 enhances the ability of the thin-client server system 220 to process streaming video without burdening the thin-client server system 220 with additional special software, video renderers, or codecs. Moreover, because the Direct Media engine 308 operates on video frames one frame at a time, very little memory is allocated on the server.

Additionally, because of the encoding scheme used by the Direct Media engine 308 to output a series of encoded video frames, video and audio synchronization problems are minimized. Each encoded video frame encapsulates audio data that accompanies the video data in the frame. Timing information relating to audio and video synchronization also is encapsulated with the frame. As a result, video frames will never be more out of synchronization for more than one frame. The alternative path for streaming video disclosed herein does not provide time or timestamp information with the transmitted video frames. Additionally, no information about start and stop states is provided. Rather, the application executing video playback is tasked with determining when to start and stop the video playback. In contrast, other systems that stream video may require the use of a unique media player to determine start and stop states. Other systems also may rely on the client to reassemble separate video and audio data streams. This scenario may be susceptible to more severe synchronization problems.

Although the preceding and subsequent embodiments are described with respect to a virtual video device driver, the entirety of the disclosure herein may equally apply to a physical video device driver that is capable of efficiently streaming video from physical devices. The reference to virtual video device drivers may pertain, in some embodiments, to Remote Desktop sessions. However, the techniques disclosed in the present application may equally apply in a one-to-one or one-to-many environment of remote terminals connected to a computer system.

Figure 4:
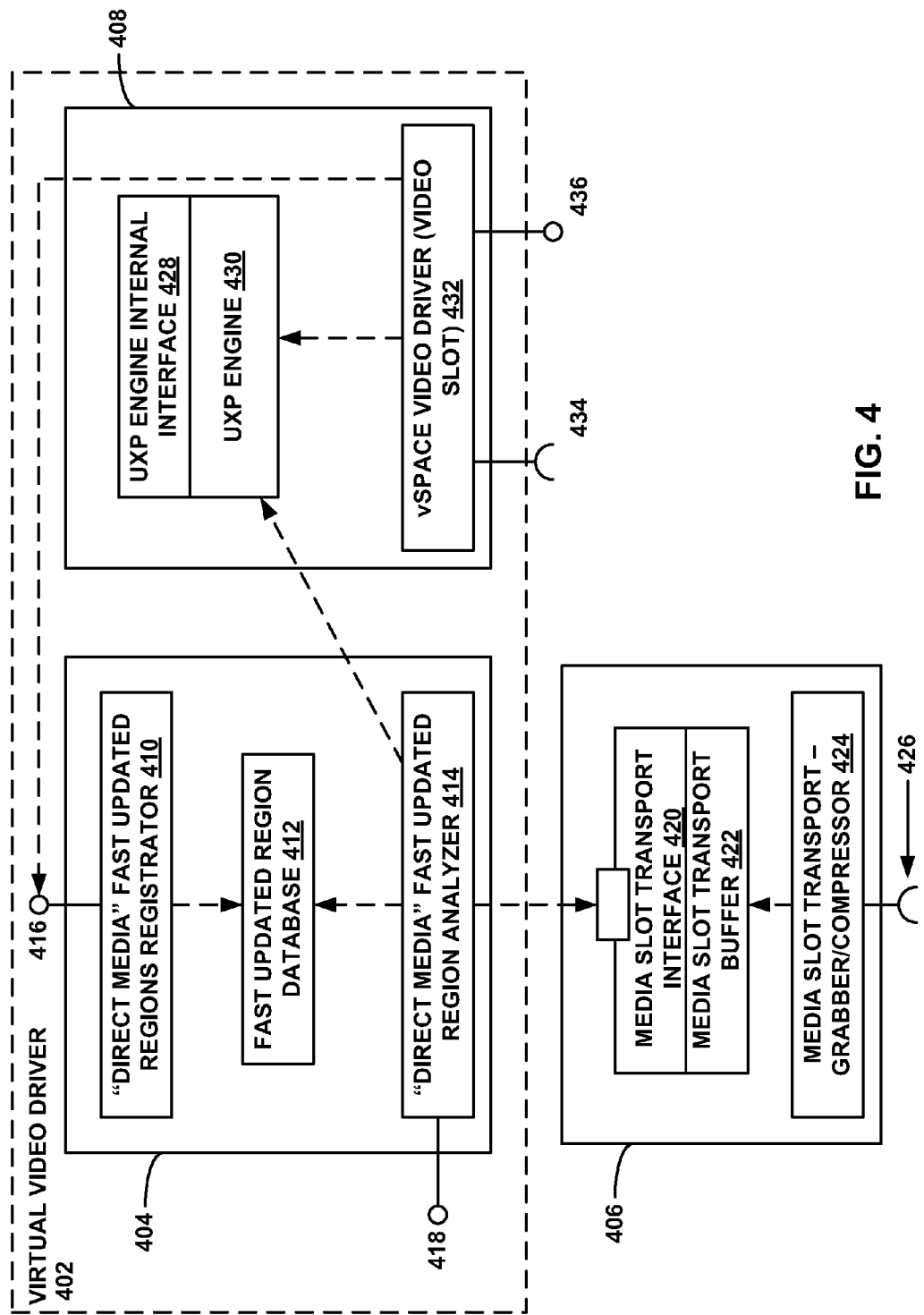
FIG. 4 illustrates a block diagram of an example method for streaming video information.

Referring to FIG. 4, a block diagram illustrating an example flow of data for streaming video data is shown. A virtual or physical video device driver 402 may include a Direct Media engine 404 and a Core Video driver 406. With reference to FIG. 2B, the virtual or physical video driver 402 may reside in the operating system abstraction level 206 or the kernel abstraction level 204, to the extent the operating system 206 and kernel 204 are segregated. In one example embodiment, the virtual or physical video device driver 402 may operate and be loaded in the kernel space of virtual or physical memory. The virtual or physical video device driver 402 may operate in conjunction with a video device driver (not shown) and with any video drivers or video processing subsystems or mechanisms provided by the operating system. As previously noted, the virtual or physical video device driver 402 may operate in conjunction with and be supported by the Microsoft Windows® operating system, the Linux® operating system, and other known operating systems.

A client device, such as the thin-client terminal system 240, may request execution of an application. In a thin-client environment, the thin-client server system 220 may execute the application on behalf of the client and receive various input requests from the terminal system 240 to interact with the application. The server system may process the requests and provide an output to the user. The output may include a graphical display of the application. As the thin-client terminal system 240, in example embodiments, may have limited graphics processing capabilities, the server system may generate and process the graphics to be displayed on a display screen of the terminal system 240. Graphics capabilities may be handled by an integrated graphics chipset or a separate graphics card along with functionality, in the form of, for example, device drivers and APIs, provided with the operating system. For example, in the Microsoft Windows® family of operating systems, a graphical driver interface (GDI) is employed to draw graphical objects for display.

As disclosed in the example embodiments discussed herein, not every video format is capable of being processed by Microsoft's DirectShow®. As a result, the example embodiments disclosed herein discuss a virtual or physical video device driver that provides an alternate path for processing and streaming video data. When the alternate path is invoked, the operating system (OS) GDI calls the virtual or physical video device driver 402 with a drawing operation, for example, via an OS direct GDI callback interface 436. In one example embodiment, the OS GDI calls the virtual or physical video device driver 402 for every drawing operation. In response to the GDI call, the virtual or physical video device driver may call the "Direct Media' fast updated regions registrator 410 located in the Direct Media video driver subsystem 404 to notify the fast updated regions registrator 410 that some regions of the display screen have been updated. In response to the notification, the regions of the display screen that have been updated are stored in a fast updated region database 412.

The regions may be analyzed by a Direct Media Fast Updated Region Analyzer 414 in response to a polling call issued to the virtual or physical video device driver 402 and received via an internal pool interface 418. Analysis of the updated regions of the display, as represented in one example embodiment at a moment in time by a video frame stored in a frame buffer, may comprise examining the video frame for regions, potentially corresponding to the updated regions, for moving video. Moving video may be represented by a fast rate of change in successive video frames, a regular period of updating lasting for a predetermined time, and a minimize size of a region in which moving video is suspected. In one example embodiment, the Direct Media Fast Updated Region Analyzer 414 may look for a rate of change of 12 times a second. In one example embodiment, the Analyzer 414 may look for a regular period of updating lasting at least one half of a second. Further, in one example embodiment, the Analyzer 414 may look for a region of moving video of at least 320 pixels by 240 pixels. Any smaller region may not warrant processing by the virtual or physical video device driver 402 as the network bandwidth cost to transmit a video frame having a small region of moving video may not be prohibitive.

If the Analyzer 414 discovers regions in the video frame containing moving video, the region(s) may be marked as "streamed" to indicate that the region contains streaming video. Regions that are marked as "streamed" are then excluded from processing by a virtual or physical video device driver protocol used to render a video frame. Regions marked as "streamed" may be aligned depending on whether the virtual or physical video device driver protocol uses alignment. A video frame having regions marked as "streamed" also may have its background filled with a key color, such as blue, depending on if a client device uses or recognizes key colors.

The region data analyzed by the Analyzer may be stored in a Media Slot Transport buffer 422 via Media Slot Transport Interface 420. The region data may be marked in the buffer 422 as "streamed" to indicate the region data contains streaming video. The Media Slot Transport—Grabber/Compressor 424 may check the buffer 422 for data. If data is present in the buffer 422, the Grabber/Compressor 424 may compress the data according to a compression protocol. In an example embodiment, the Grabber/Compressor 424 may compress the region data using a JPEG image format. The Grabber/Compressor 424 then sends the compressed data over a TCP/IP link 426 or other transport protocol link to the remote client.

In the event regions marked as "streamed" or updated regions fail to meet the conditions used by the Analyzer 414 to identify streaming video regions, the Analyzer may transmit data corresponding to these regions to the virtual or physical video device driver protocol engine 430, labelled as UXP Engine in FIG. 4, via UXP Engine Internal Interface 428. As such regions correspond to video display screen data, rather than streaming video data, such regions may be refreshed and sent via TCP/IP link 434 to the remote client.

Figure 5:
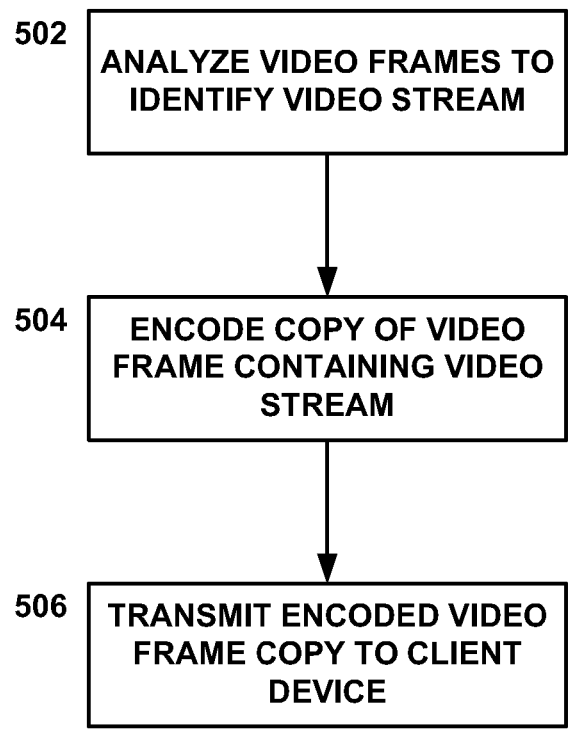
FIG. 5 illustrates a flowchart of an example method for streaming video information.

Referring to FIG. 5, a flowchart diagram illustrating an example method for streaming video data is shown. At operation 502, an application may execute on the thin-client server system 220 in response to a request from a thin-client terminal system, such as remote client 314. For example, a browser application may execute on the thin-client server system 220. The application may access a video file and invoke the graphics display driver or virtual or physical video device driver 304 to render video frames from the video file. Meanwhile, a virtual or physical video device driver 304 containing the Direct Media engine 308 may reside in the operating system.

At operation 504, a polling call to the virtual or physical video device driver may be placed to begin analyzing the contents of the frame buffer. The polling call may occur at the same time the application is executing video playback in the server system. If the contents of the frame buffer meet the specified conditions for moving video (e.g., fast and regular updating, at least a minimum pixel size), the Direct Media engine 308 may be invoked to encode a copy of the video frame stored in the frame buffer.

At operation 506, the virtual or physical video device driver 304 may check the contents of the frame buffer to determine if new data is present in the frame buffer. If new data is present in the frame buffer, a copy of the frame buffer is created and sent to the Direct Media engine 308. The Direct Media engine 308 encodes the video frame according to a predetermined encoding format that is supported by the client system. The encoded video frame is sent to the media slot transport channel 312 for transmission to the remote client via TCP/IP or another known transport protocol. The video frame may be marked as sent. In one example embodiment, operations 502, 504, and 506 may be performed concurrently.

Figure 6:
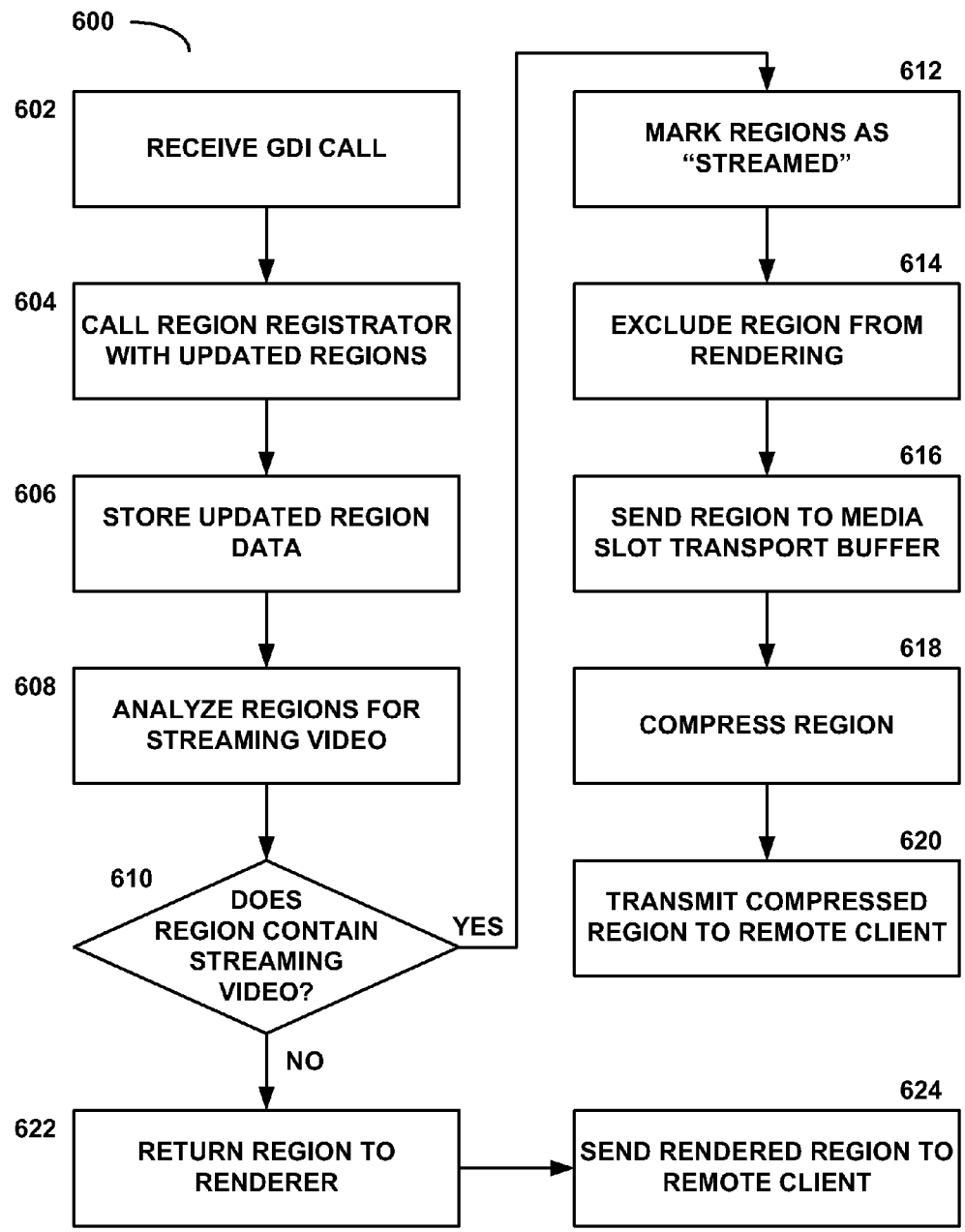
FIG. 6 illustrates a flowchart of an example method for streaming video information.

Referring to FIG. 6, a flowchart illustrates an example method for streaming video information. At operation 602, a virtual or physical video device driver residing in an operating system or kernel space of a computer system, such as a thin-client server system 220, may receive an operating system graphics driver interface (GDI) call when the GDI needs to perform a drawing operation. At operation 604, the virtual or physical video device driver may call a Direct Media Fast Updated Regions Registrator of a Direct Media Engine subsystem of the virtual or physical video device driver. The Registrator may be informed by the GDI call or by the virtual or physical video device driver that regions in a frame buffer have been updated. At operation 606, the regions purportedly updated are stored in a Fast Updated Region Database.

At operation 608, a Direct Media Fast Updated Region Analyzer may be called by a polling call. At operation 610, the Analyzer may examine the stored region data to identify whether the region data contains streaming video. This determination may be made by identifying whether the region data is updated quickly (e.g., 12 times per second) and regularly (e.g., for a duration of at least one half of a second). The region data is further examined to determine the size of the fast and regular updating. If the size is large enough (e.g., 320 pixels by 240 pixels), then the region is determined to contain streaming video that should be processed by the Direct Media Engine subsystem.

At operation 612, if the analyzed region data is determined to contain streaming video, the regions are marked as "streamed" to indicate the presence of streaming video. At operation 614, the regions marked "streamed" are excluded from processing by a UXP Engine, which executes an internal virtual or physical video device protocol for rendering graphics. At operation 616, the regions marked "streamed" are transmitted to a Media Slot Transport buffer for storage. At operation 618, a Media Slot Transport Compressor/Grabber may retrieve the data from the Media Slot Transport buffer and compress the region data using a predetermined compression scheme. The compression scheme may be determined by identifying which schemes are supported by a remote client to whom the display and graphics data is to be sent. In one example embodiment, region data may be compressed using the JPEG image compression scheme. At operation 620, the compressed region data may be sent to the remote client.

If the analyzed region data is determined not to contain streaming video, at operation 622, the region data may be returned to the UXP Engine for rendering. At operation 624, the rendered region data may be transmitted via a Video Slot Transport channel to the remote client for display.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of streaming video information, the method comprising:
   analyzing, using a video device driver, video frames stored in a frame buffer to identify a video stream, wherein said analyzing comprises:
      identifying a region of the video frames being updated;
      identifying a duration of the updating of the video frames;
      determining a size of the region of the video frames, wherein the video stream is identified if:
         the region of the video frames is being updated greater than a predetermined number of times per second;
         the duration of updating of the video frames is greater than a predetermined duration;
         the region of the video frames is not a scroll area;

the region of the video frames is not part of an application determined to not stream video; and the size of the region of the video frames is greater than a predetermined pixel resolution size;

excluding a video frame containing the video stream from being rendered by the video device driver;

encoding a copy of the excluded video frame containing the video stream according to an encoding format supported by a client device requesting the video stream; and transmitting the encoded video frame in an encoding format-independent transmission channel to the client device.

2. The method of claim 1, wherein the video device driver is one of a virtual video device driver and a physical video device driver.

3. The method of claim 1, further comprising inserting the video device driver in an operating system memory.

4. The method of claim 1, further comprising marking the video frame containing the video stream to indicate a presence of the video stream.

5. The method of claim 1, further comprising rendering a subset of the video frames that do not contain the video stream.

6. The method of claim 1, wherein the encoding format is JPEG.

7. The method of claim 1, further comprising transmitting a signaling frame to the client device, the signaling frame comprising a color block, the signaling frame instructing the client device to perform a predetermined operation on the encoded video frame copy.

8. The method of claim 7, wherein the predetermined operation comprises scaling the size of the encoded video frame copy.

9. A system for streaming video information, comprising:
at least one processor;
a first memory configured to store video frames;
a video device driver implemented by the at least one processor and configured to analyze the video frames to identify a video stream and to exclude a video frame having a region containing the video stream, the video device driver comprising:
a fast updated regions registrator configured to register a second subset of the video frames containing updated regions;
a fast updated region database configured to store the second subset of the video frames; and
a fast updated region analyzer configured to analyze the stored second subset of the video frames to identify the video frame containing the video stream and configured to analyze the stored second subset of the video frames by determining a region of a predetermined size of the stored second subset of the video frames being updated at a predetermined rate and duration, by determining that the region of the video frames is not a scroll area, and by determining that the region of the video frames is not part of an application determined to not stream video; and
a first encoding format-independent media transport configured to:
encode a copy of the excluded video frame having the region containing the video stream, the encoding corresponding to an encoding format supported by a client device requesting the video stream; and transmit the encoded video frame copy to the client device.

10. The system of claim 9, wherein the video device driver is one of a virtual video device driver and a physical video device driver.

11. The system of claim 9, wherein the processor-implemented video device driver further comprises a processor-implemented video driver engine configured to receive and output graphical updates to the client device via a encoding format-independent video transport.

12. The system of claim 9, wherein the encoding format is JPEG.

13. The system of claim 9, wherein the processor-implemented video device driver further comprises a direct media engine configured to output a signaling frame to the client device, the signaling frame comprising a color block, the signaling frame instructing the client device to perform a predetermined operation on the encoded video frame copy.

14. The system of claim 9, wherein the predetermined operation comprises scaling the size of the encoded video frame copy.

15. A non-transitory computer-readable storage medium storing a set of instructions, that when executed by at least one processor, causes the at least one processor to perform operations comprising:
analyzing, using a video device driver, video frames stored in a frame buffer to identify a video stream, wherein said analyzing comprises:
identifying a region of the video frames being updated;
identifying a duration of the updating of the video frames;
determining a size of the region of the video frames, wherein the video stream is identified if:
the region of the video frames is being updated greater than a predetermined number of times per second;
the duration of updating of the video frames is greater than a predetermined duration;
the region of the video frames is not a scroll area;
the region of the video frames is not part of an application determined to not stream video; and
the size of the region of the video frames is greater than a predetermined pixel resolution size;
excluding a video frame containing the video stream from being rendered by the video device driver;
encoding a copy of the video frame containing the video stream according to an encoding format supported by a client device requesting the video stream; and
transmitting the encoded each video frame in an encoding format-independent transmission channel to the client device.

16. The non-transitory computer-readable storage medium of claim 15, wherein the video device driver is one of a virtual video device driver and a physical video device driver.

17. The non-transitory computer-readable storage medium of claim 15, further comprising inserting the video device driver in an operating system memory.

18. The non-transitory computer-readable storage medium of claim 15, further comprising:
marking the video frame containing the video stream to indicate a presence of the video stream; and
rendering a subset of the video frames that do not contain the video stream.

19. The non-transitory computer-readable storage medium of claim 15, wherein the encoding format is JPEG.

* * * * *